C. M. MENDENHALL.
GAGE GLASS.
APPLICATION FILED APR. 20, 1912.
1,142,262.
Patented June 8, 1915.
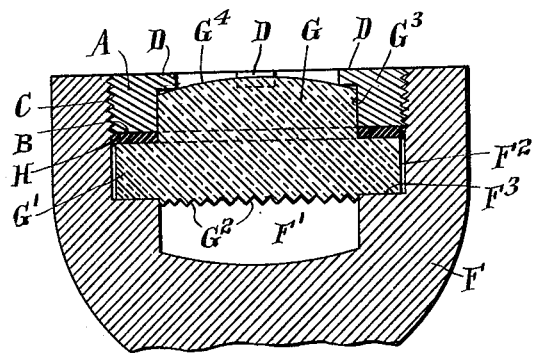
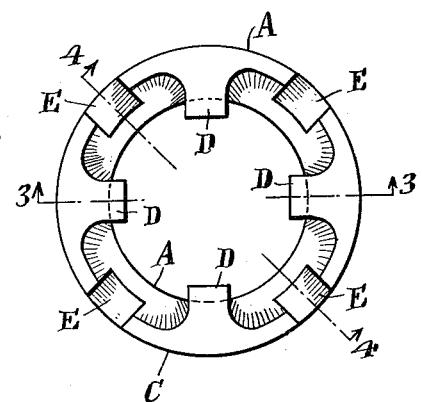
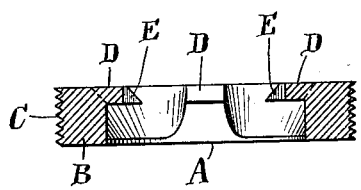
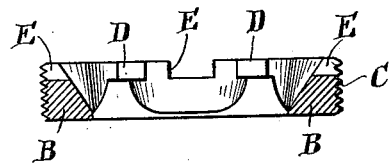
WITNESSES
INVENTOR
Clarence M. Mendenhall
BY
his ATTORNEY

UNITED STATES PATENT OFFICE.

CLARENCE M. MENDENHALL, OF NEW YORK, N. Y.

GAGE-GLASS.

1,142,262.   Specification of Letters Patent.   Patented June 8, 1915.

Application filed April 20, 1912. Serial No. 692,188.

*To all whom it may concern:*

Be it known that I, CLARENCE M. MENDENHALL, a citizen of the United States of America, residing in the city, county, and State of New York, have invented a certain new and useful Improvement in Gage-Glasses, of which the following is a true and exact description, reference being had to the accompanying drawings, which form a part thereof.

My invention relates to gage glasses and has for its object to provide a novel means for securing the gage glass in the metallic part of the gage.

In gages, as heretofore constructed, it is quite usual to place the gage glass or glasses in recesses formed in the metallic part of the gage and secure it or them in place by means of packing holding strips or rings which serve the double purpose of holding the glass in place and of compressing the packing to prevent leakage around the edges of the glass. Owing to the great changes in temperature to which the gage glasses are exposed breakage of the glass is a very usual occurrence and to prevent or minimize such breakage it has been suggested to use in place of a long sight glass rows of bull's-eyes and in my own experience I have successfully used such bull's-eyes of the special construction described in my pending application for Letters Patent filed March 3, 1910, Serial Number 547,011.

I have found by experience however that even with the bull's-eye glass breakage of the glass is apt to occur and to provide for such occurrences and to minimize their danger is the object of my present invention, which consists, broadly speaking, in providing a packing holder which has, in addition to its packing holding face, a flange or flanges adapted to extend inwardly from the holder at a higher level than its packing holding face and to extend over a portion of the glass lying within the holder so that in case of breakage of the sight glass the flange or flanges of the holder will tend to prevent the blowing out of the glass and consequent free escape of steam or water from the gage. By preference, and because the inwardly extending flange of the holder will necessarily obscure more or less the face of the sight glass I form the supplemental holding devices of the packing holder as a series of supported fingers or flanges leaving the greater part of the sight glass lying within the packing ring proper and fully exposed as is now usually the case.

Reference being now had to the drawings which illustrate my invention in the form in which I prefer to employ it, Figure 1 is a cross sectional view through a portion of a gage showing the manner in which my improved packing ring is employed in securing a bull's-eye sight glass in place. Fig. 2 is a plan or top view of the improved packing holding ring. Fig. 3 a cross section of the ring on the line 3—3 of Fig. 2, and Fig. 4 a cross section of the ring on the line 4—4 of Fig. 2.

The metallic portion of the gage shown in Fig. 1 is of a usual type, the frame being indicated at F, the water or steam space at F′ and the circular space for the bull's-eye glass being indicated at F², the seat for the glass being indicated at F³.

G is the bull's-eye gage glass having flanges G′ which rest on the shoulder F³, a prismatic inner face indicated at G² and a cylindrical extension G³ extending up from the flanges G′ and terminating in a preferably concave face G⁴. The construction of this bull's-eye sight glass is that devised by me and forming the subject matter of my pending application above mentioned.

H is the packing which is placed in the recess F² above the flange G′ of the sight glass and held in place by the packing ring A which, as shown, is of circular outline, having its outer face C externally threaded to screw into the threaded recess F² and clamp the packing H against the flange of the sight glass.

B is the packing holding face of the packing ring; E E, etc., recesses formed in the upper face of the packing ring to provide convenient holding points for a spanner wrench or other means employed to screw the packing ring A into and out of the threaded recess F². D D, etc., are inwardly extending fingers or flanges situated above the packing holding face of the ring and adapted to extend over portions of the sight glass lying within the ring.

It will readily be seen that in case the sight glass is fractured in such a way as to release it from the ordinary holding face of the packing ring that its expulsion from the gage will be prevented by the inwardly extending flanges or fingers D D and thus the dangers incident to the breaking of gage glasses will be greatly diminished if not entirely overcome.

Having now described my invention, what I claim as new and desire to secure by Letters Patent is,

1. In a gage, the combination of a gage body formed with a sight aperture, a gage glass closing said aperture and formed with a body portion and with a marginal flange at the inner side of said body portion and a glass retaining member surrounding said body portion and acting against said flange and formed with a portion projecting in front of the outer face of the body portion of said glass.

2. In a gage, the combination of a gage body formed with a sight aperture, a gage glass closing said aperture and formed with a body portion and with a marginal flange at the inner side of said body portion, a packing holder surrounding the body portion of said glass, and a packing interposed between said holder and flange, said holder being provided with a series of separated flanges projecting in front of the outer face of the body portion of said glass.

CLARENCE M. MENDENHALL.

Witnesses:
RUSSELL BUNCE,
I. A. BOOTH.

Copies of this patent may be obtained for five cents each, by addressing the "Commissioner of Patents, Washington, D. C."